Figure 1:
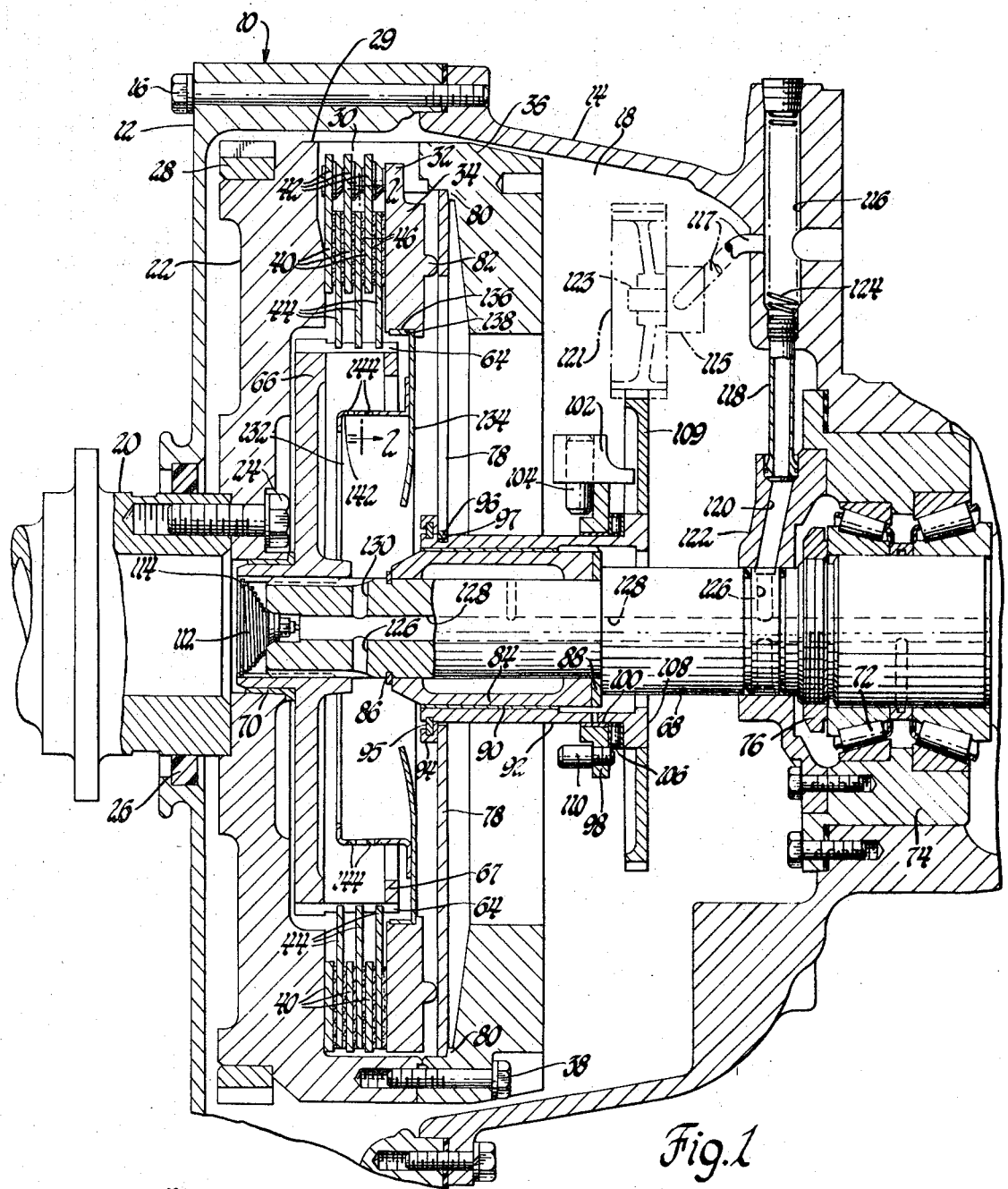

United States Patent

[11] 3,552,534

| [72] | Inventor | Luther N. Kern<br>Berkley, Mich. |
|---|---|---|
| [21] | Appl. No. | 754,844 |
| [22] | Filed | Aug. 23, 1968 |
| [45] | Patented | Jan. 5, 1971 |
| [73] | Assignee | General Motors Corporation<br>Detroit, Mich.<br>a corporation of Delaware |

[54] WET CLUTCH OIL SLINGER
10 Claims, 2 Drawing Figs.

[52] U.S. Cl. ............................................. 192/113
[51] Int. Cl. ......................................... F16d 13/72
[50] Field of Search ................................ 192/113.2

[56] References Cited
UNITED STATES PATENTS

| 2,498,123 | 2/1950 | Hobbs | 192/113.2 |
| 2,523,501 | 9/1950 | Davies et al. | 192/113.2UX |
| 3,249,189 | 5/1966 | Schjolin | 192/113.2X |
| 3,314,513 | 4/1967 | Lake et al. | 192/113.2X |
| 3,334,717 | 8/1967 | Spokas et al. | 192/113.2 |
| 3,452,848 | 7/1969 | Brunner | 192/113.2 |

*Primary Examiner*—Benjamin W. Wyche III
*Attorneys*—E. W. Christen, A. M. Heiter and John P. Moran ABSTRACT: The clutch shown has an oil slinger comprising an annular plate pressed or snap-fitted in a groove formed in the inside surface of the conventional clutch presser plate which rotates with the engine flywheel. The plate is made of solid sheet metal in order to serve as a wall of an oil reservoir or trough. The slinger further comprises a drum having one end flange thereof secured to the annular plate and a second radially inwardly extending flange at the other end serving as the other wall of the annular oil trough. The center portion of the drum is perforated, and oil which collects in the rotating trough is thrown outwardly through the perforations under the action of centrifugal force and confined between the flywheel and annular plate, providing continuous lubrication for the clutch plates or discs, regardless of whether the clutch is engaged or disengaged.

PATENTED JAN 5 1971

3,552,534

INVENTOR.
Luther N. Kern

BY
a. M. Heiter
ATTORNEY

WET CLUTCH OIL SLINGER

This invention relates to clutches and more particularly to an improved lubrication means therefor.

Prior art clutches have taught the use of a fluid reservoir formed on the driven clutch hub, wherein fluid is supplied both when the clutch is engaged and when it is released, by a continuously driven pump. So long as the clutch is engaged, the fluid is thrown outwardly under action of centrifugal force to cool and lubricate the clutch discs. However, when the clutch is disengaged and the hub is not rotating, fluid from the reservoir is transmitted to the clutch discs through openings in the hub flange by gravity action alone.

In other words, only a limited supply of fluid leaks through the openings onto the clutch discs. Hence, each time that the clutch is engaged and heat is produced by friction due to the initial slipping engagement, an insufficient amount of oil is available for cooling the clutch plates, and clutch life is decreased as a result. This becomes important in vehicles such as trucks and busses wherein frequent startup from a stopped position and frequent shifting of gears is encountered.

Accordingly, a primary object of the invention is to provide a novel means for properly lubricating the clutch plates at all times that the motor vehicle is being operated, whether the clutch is engaged or disengaged.

Another object of the invention is to provide such a means wherein oil is supplied to the clutch plates by centrifugal action even when the clutch is disengaged.

A further object of the invention is to prove provide such a means wherein a drum or slinger is continuously rotated in a fluid reservoir by the engine-driven input shaft and its associated flywheel, thereby supplying fluid to the clutch plates by centrifugal action all the while that the engine is running.

Figure 2:
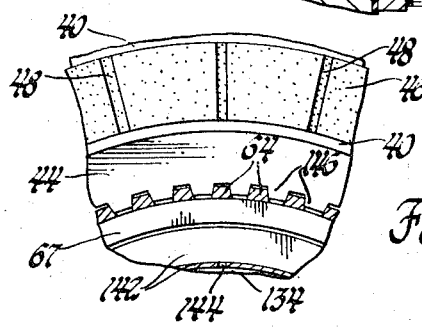

Other objects and advantages of the invention will become more apparent when reference is made to the following description and accompanying drawings wherein:

FIG. 1 is a cross-sectional view of a clutch assembly embodying the invention; and FIG. 2 is a fragmentary cross-sectional view taken along the plane of line 2–2 of FIG. 1, and looking in the direction of the arrows.

Referring now to the drawings in greater detail, FIG. 1 illustrates a clutch assembly constructed in accordance with the principles of this invention, including a clutch housing, indicated generally at 10, formed of two detachable clutch housing sections 12 and 14 retained in assembled relationship by means of suitable bolts 16, the two housing sections 12 and 14 forming a chamber 18 therein.

An engine-driven power input shaft 20 extends into the chamber 18 and has a flywheel 22 bolted thereon by bolts 24. An oil seal 26 prevents fluid leakage from the chamber 18 past the shaft 20. The flywheel 22 is provided with a ring gear 28 for engagement by a conventional engine starter (not shown) and a drum portion 29 having a plurality of flat, axially extending slots 30 adapted to contact lugs or projections 32 formed on an annular axially movable pressure or presser plate 34. An annular cover plate or stiffening rib 36 is secured to one end of the flywheel 22 by any suitable means, such as bolts 38.

A drive disc clutch assembly, comprising a plurality of driving discs or plates 40, having external splines or lugs 42 extending into the slots 30 in flywheel 22 for rotation therewith and axial movement with respect thereto and a plurality of intermediately located driven clutch discs or plates 44 which are internally splined (FIG. 2) for axial movement on a plurality of axially extending spline ribs 64 of a clutch hub 66. The ribs 64 are supported at their outer ends by an internal flange 67.

One set of clutch discs, such as driven discs 44, have a friction material surface 46 on both sides, the surfaces 46 having grooves 48 therein, so cooling fluid can pass between the discs when they are engaged.

Suitable configurations of the driven discs 44 and the driving discs 40 are illustrated and described in U.S. Pat. No. 3,249,189, issued May 3, 1966 in the names of H. O. Schjolin, et al.

A clutch driven shaft 68 is piloted at one end thereof in the flywheel 22 by means of a bushing 70 and is supported in housing section 14 by means of a suitable bearing 72 supported in the housing 14 by a bearing retainer 74. A nut 76 is screw-threaded on the shaft 68 to maintain the bearing 72 in its proper position on the shaft 68.

Resilient means, such as a Belleville clutch spring 78, provides conventional clutch operating means and is rotatably carried by the cover plate 36, secured in any suitable manner to a lip or ridge 80 formed on the plate 36. The spring 78 contacts an axially extending boss 82 formed on the presser plate 34 and normally biases the presser plate 34 to engage the clutch. The lip 80 serves as the reaction point for the spring 78.

An adapter 84 is retained on the driven shaft 68 by means of a snap ring 86 and a washer 88. A bushing 90 supports a clutch throwout sleeve 92 on the adapter 84 for axial motion with respect to the shaft 68. A main spring thrust ring 94 fixed on the sleeve 92 by a retainer ring 95 contacts the inner portion of the Belleville spring 78 to move the spring 78 in response to axial motion of the sleeve 92. A projection 96 formed on the inner portion of the spring 78 fits into a slot 97 on the sleeve 92 in order to cause the sleeve 92 to rotate with the spring 78. A thrust ring 98 is supported on a bushing 100 on the clutch throwout sleeve 92 may be moved axially by a clutch throwout fork 102 and a pin 104. A clutch throwout thrust bearing 106 is disposed between the thrust ring 98 and a flange 108 formed on the sleeve 92. A gear 109 is fixedly secured to the flange 108 for rotation therewith. A pin 110 on the clutch throwout thrust ring 98 cooperates with the pin 104 on the clutch throwout fork 102 to prevent rotation of the thrust ring 98.

A coil spring 112 seated upon a retaining ring 114 mounted along the axis of the clutch hub 66 against the end of the shaft 68 biases the clutch hub 66 to the left, as viewed in the drawing, against the bushing 70.

In operation, the Belleville spring 78 normally biases presser plate 34 to engage the clutch with the lip 80 of the cover plate 36 serving as the reaction point for the spring 78. To release the clutch, the fork 102 may be actuated through any conventional linkage by means of a conventionally manually actuated clutch pedal (not shown) to move the sleeve 92 toward the right in the drawing, thereby releasing the pressure on the presser plate 34 by the spring 78, due to the rightward movement (FIG. 1) of the thrust ring 94.

A pump, represented schematically at 115, draws oil from the bottom of a sump (not shown) and delivers the oil under pressure to a passage 116 in the clutch housing via a conduit 117. The pump 115 is driven continuously whenever the flywheel 22 is rotated, the Belleville spring 78 driving the clutch throwout sleeve 92 and the gear 109, and the latter, in turn, driving a pump drive gear 121 secured to a shaft 123 of the pump 115. The passage 116 is connected via an oil transfer tube 118 to a passage 120 formed in a guide 122. A spring 124, mounted in the passage 116, abuts against one end of the tube 118 to retain the other end thereof in a counterbored opening in the guide 122. The passage 120 delivers fluid under pressure to an inlet passage 126 in the shaft 68 and thence to a central passage 128. The passage 128 supplies oil under pressure to the transmission (not shown) via the exit to the right in FIG. 1 and through cross passages 130 to a reservoir 132 formed on the flywheel 22 within the extension 64 of the driven clutch hub 66 in a manner which will now be described.

A radially inwardly extending annular plate 134 is secured at its outermost edge or flange surface 136 by any convenient means, such as by being press-fitted in a groove 138 formed in the inner wall of the presser plate 34 and against an inner rib at the end of the groove. The inwardly extending plate 134 serves as one wall of the reservoir 132. A drum 142, having a cylindrical body and flanged ends, is secured at one of the end flanges thereof to an intermediate portion of the plate 134. A second, radially inwardly extending, flange of the drum 142 serves as the other wall of the annular oil trough or reservoir 132. The drum 142 extends from the plate 134 to the left in the drawing, such that it is confined within the extension 64 of the clutch hub 66. A plurality of perforations or openings 144 are formed through the cylindrical wall of the drum 142. The spacings 146 (FIG. 2) between the ribs 64 of the clutch hub 66 serve to complete the radial communication from the oil reservoir 132 to the clutch discs 40 and 44.

In operation, so long as the power input shaft 20, flywheel 22 and the presser plate 34 are being rotated, it is apparent that the associated reservoir 132 will also be rotated. This will cause the oil, which is being continually pumped into the reservoir 132 via the passages 116, 118, 120, 126, 128 and 130, to be thrown under the action of centrifugal force through the perforations 144 in the drum 142 and thence through the openings 146 between the clutch hub ribs 64, and possibly around the end rib 67, onto the plurality of clutch plates or discs, whether or not they are engaged by the presser plate 34.

The rotary speed of the flywheel 22 and the drum 142 is such that the drum normally slings out the oil as fast as it is supplied by the pump 115, without it spilling over the wall of the reservoir 132. As a result of the oil attaining a level across and around the circumference of the cylindrical portion of the drum 142, under the action of centrifugal force, prior to its being projected out through the openings 144, the elongated openings 146 between the splines 64 provide maximum fluid communication through the drum 66. It is apparent that each of the clutch discs 40 and 44 will receive a proportionate share of the total volume of oil, thereby assuring that none of the discs will be bypassed by the coolant.

As will be noted above and in the above-mentioned U.S. Pat. No. 3,249,189, channels or grooves are formed on the faces of the clutch discs in order to permit the oil to flow through and back to the chamber 18 when the clutch is engaged. The portion of the annular plate 134 which is connected to the presser plate 34 and located radially outward from the perforated drum 142 and the adjacent flywheel sidewall and the closely spaced driven hub 66 forms a substantially closed chamber and causes all the oil to flow past the clutch discs 40 and 44 and/or through their respective channels, and prevents any of the oil from passing via the spring side of the presser plate 34, to the right in FIG. 1 or the other side of the clutch pack to the left in FIG. 1.

It is apparent that the clutch discs will be continually cooled by the above process. Each time that the clutch is engaged, heat is produced by friction due to the initial slipping engagement. Hence, unless oil is available in sufficient volume during the startup procedure, clutch life will be substantially decreased. It is apparent that the invention solves this problem and increases clutch life by supplying a continual substantial flow of oil to cool the clutch discs, whether the clutch is engaged or disengaged, and particularly when disengaged and during the engagement process.

While but one embodiment of the invention has been illustrated and described, it is apparent that other modifications thereof are possible.

I claim:

1. A clutch assembly comprising a housing, power input means rotatably mounted in said housing, power delivery means rotatably mounted in said housing coaxial with said power input means, a driving clutch drum mounted for rotation with said power input means, a driven clutch drum concentrically located within said driving clutch drum and secured to said power delivery shaft for driving said power delivery shaft, a plurality of clutch discs including a clutch driving disc operatively connected to said driving clutch drum for rotation therewith and an intermediate clutch driven disc located adjacent said driving disc and secured to said driven drum, clutch operating means operatively connected to said clutch disc for engaging and releasing said driving and driven discs, pump means driven by said power input means to continuously supply fluid under pressure when said power input means is operating and maintain full volume delivery during operation of said clutch operating means and particularly when said clutch is released, annular trough means connected to said driving drum for rotation therewith at all times and having an annular cylindrical wall located radially inwardly of and concentric with and directly closely adjacent to said driven drum with an open space between said annular wall and driven drum, and sidewall portions extending inwardly from said annular wall on each side of said annular wall to provide an annular fluid-collecting trough, said driven drum having a plurality of radial apertures to permit fluid to pass radially through said driven drum, passage means connected to said pump means to supply fluid to the internal surface of said annular wall between said sidewall portions to provide an annular body of fluid in said annular fluid-collecting trough of said annular trough means, and said annular trough means having an annular series of radial openings formed in said annular wall radially aligned with said apertures for receiving and radially projecting the fluid by centrifugal force during said rotation of said annular trough means by said input means to discharge fluid solely in a radial direction through said radial openings and said open space and directly to said driven clutch drum and directly through said apertures in said driven drum to lubricate said clutch discs during operation of said clutch operating means and particularly when said clutch is released.

2. A clutch assembly comprising a housing, power input means rotatably mounted in said housing, power delivery means rotatably mounted in said housing coaxial with said power input means, a driving clutch drum mounted for rotation with said power input means, a driven clutch drum concentrically located within said driving clutch drum and secured to said power delivery shaft for driving said power delivery shaft, a plurality of clutch discs including a clutch driving disc operatively connected to said driving clutch drum for rotation therewith and an intermediate clutch driven disc located adjacent said driving disc and secured to said driven drum, clutch operating means operatively connected to said driving clutch drum for engaging and releasing said driving and driven discs, pump means driven by said power input means to continuously supply fluid under pressure when said power input means is operating, annular trough means connected to said driving drum for rotation therewith at all times and being located radially inwardly of said driven drum, said driven drum having a plurality of radial apertures to permit said fluid to pass radially through said driven drum, passage means connected to said pump means to supply said fluid to said annular trough means, and said annular trough means having radial openings formed therein substantially radially aligned with said apertures for receiving and projecting the fluid by centrifugal force during said rotation of said annular trough means by said input means to discharge said fluid radially through said radial openings and through said apertures in said driven drum to lubricate said clutch discs, and a pressure plate operatively connected to said driving clutch drum for rotation therewith and for axial movement thereon, said annular trough means being secured to said pressure plate and having a side thereof which prevents any of said fluid from bypassing said clutch discs around the end thereof.

3. The assembly described in claim 2, wherein said driven clutch drum forms a closed wall which prevents any of said fluid from bypassing said clutch discs around the other end thereof.

4. A clutch assembly comprising a housing, a power input shaft rotatably mounted in said housing, a flywheel driven by said shaft, a power delivery shaft rotatably mounted in said housing coaxial with said power input shaft, a driven clutch hub fixedly secured to said power delivery shaft and concentrically located within said flywheel, a plurality of driving clutch discs operatively connected to said flywheel for rotation therewith, a plurality of driven clutch discs secured to said clutch hub for driving said clutch hub upon engagement of said driven discs by said driving discs, clutch operating means for engaging and releasing said driving and driven discs, a source of oil, reservoir means operatively connected to said flywheel for continual rotation therewith, delivery means for supplying said oil from said source to said reservoir means, said reservoir means having radial openings formed therein for collecting oil and projecting oil radially through said openings and directly to said driving and driven discs as a result of the action of centrifugal force, during both engagement and release of said driving and driven discs, said clutch operating means including a plate member operatively connected to said flywheel for rotation with said flywheel and said driving discs, resilient means for normally urging said plate member toward said flywheel, thereby engaging said driving and driven discs therebetween, and manually actuated means for relieving the pressure of said resilient means from said plate member, thereby releasing said driving and said driven discs, said reservoir means including a radially inwardly extending plate fixedly secured to said plate member, and a flanged cylindrical member having a plurality of perforations formed therein fixedly secured to said inwardly extending plate at an intermediate location thereon.

5. The clutch assembly described in claim 4, wherein a plurality of axially extending members are secured to the outer periphery of said clutch hub serving as splines for mounting said driven clutch discs thereon, said oil passing to said clutch discs through the openings between said members.

6. The clutch assembly described in claim 4, wherein said driven clutch discs include grooves formed on the side faces thereof for passage of said oil when said driving and driven discs are engaged.

7. The clutch assembly described in claim 4, wherein said delivery means includes a pump, and a plurality of passageways communicating from said pump and formed through said power delivery shaft for supplying oil to said reservoir means under the pumping action of said pump.

8. A clutch assembly comprising a housing, a power input shaft, a flywheel driven by said shaft, a power delivery shaft, a driven clutch hub rotatable with said delivery shaft, a plurality of driving clutch discs operatively connected to said flywheel for rotation therewith, a plurality of driven clutch discs rotatable with said clutch hub, an axially movable pressure plate rotatable with said flywheel, a clutch operating means for axially moving said pressure plate to engage and release said driving and driven clutch discs, a source of oil, first wall means fixedly secured to said pressure plate, second wall means fixedly secured to said first wall means, a plurality of openings formed in said second wall means, said first and second wall means and said openings forming a rotatable reservoir for receiving said oil supplied by pump means from said source and projecting said oil to said clutch discs under the action of centrifugal force so long as said power input shaft is rotating during both engagement and release of said driving and driven clutch discs.

9. A clutch assembly comprising a housing, a power input shaft rotatably mounted in said housing, a flywheel driven by said shaft, a power delivery shaft rotatably mounted in said housing coaxial with said power input shaft, a driven clutch hub fixedly secured to said power delivery shaft and concentrically located within said flywheel, a plurality of driving clutch discs operatively connected to said flywheel for rotation therewith, a plurality of driven clutch discs secured to said clutch hub for driving said clutch hub upon engagement of said driven discs by said driving disc, clutch operating means for engaging and releasing said driving and driven discs, a source of oil, reservoir means operatively connected to said flywheel for continual rotation therewith, delivery means for supplying oil from said source to said reservoir means, said reservoir means having radial openings formed therein for collecting oil and projecting oil radially through said openings and directly to said driving and driven discs as a result of the action of centrifugal force, during both engagement and release of said driving and driven discs, said clutch operating means including a first plate member operatively connected to said flywheel for rotation with said flywheel and said driving discs, resilient means for normally urging said firstplate member toward said flywheel, thereby engaging said driving and driven discs therebetween, and manually actuated means for relieving the pressure of said resilient means from said plate member, thereby releasing said driving and said driven discs, said driving clutch discs being located between said flywheel and said plate member for rotation therewith and said driven clutch discs being mounted on a plurality of spaced members axially extending from said clutch hub, and said reservoir means including a second plate member secured to and extending radially inwardly from said first-mentioned plate member past said axially extending members, a flanged cylindrical member secured at one flanged end to said second plate member intermediate the ends thereof and concentrically disposed within said axially extending members, the other flanged end of said cylindrical member and a portion of said radially extending flange serving as the walls of said reservoir means, said reservoir means being rotated at all times with said first plate member and said flywheel, a plurality of perforations formed in said cylindrical member, said oil being projected by the action of centrifugal force through said perforations and between said radially extending members to said driving and driven clutch discs.

10. A clutch assembly comprising a housing, power input means rotatably mounted in said housing, power delivery means rotatably mounted in said housing coaxial with said power input means, a driving clutch drum mounted for rotation with said power input means, a driven clutch drum concentrically located within said driving clutch drum and secured to said power delivery shaft for driving said power delivery shaft, a plurality of clutch discs including a clutch driving disc operatively connected to said driving clutch drum for rotation therewith and an intermediate clutch driven disc located adjacent said driving disc and secured to said driven drum, clutch operating means operatively connected to said driving clutch drum for engaging and releasing said driving and driven discs, pump means driven by said power input means to continuously supply fluid under pressure when said power input means is operating, annular trough means connected to said driving drum for rotation therewith at all times and being located radially inwardly of said driven drum and having a solid sidewall extending radially inwardly from said driving drum and extending radially inwardly past said driven drum, said driven drum having a plurality of radial apertures to permit said fluid to pass radially through said driven drum, passage means connected to said pump means to supply said fluid to said annular trough means, and said annular trough means having radial openings formed therein substantially radially aligned with said apertures for receiving and projecting the fluid by centrifugal force during said rotation of said annular trough means by said input means to discharge said fluid radially through said radial openings and through said apertures in said driven drum to lubricate said clutch discs, said solid sidewall preventing any outwardly projected fluid from bypassing said driving and driven discs.

PO-1050
(5/69)

UNITED STATES PATENT OFFICE
CERTIFICATE OF CORRECTION

Patent No. 3,552,534          Dated January 5, 1971

Inventor(s)    Luther N. Kern

It is certified that error appears in the above-identified patent and that said Letters Patent are hereby corrected as shown below:

> In claim 9, Column 6, line 9, the phrase
>      "for rotation flywheel" should be deleted;
>
>      line 11, "firstplate" should read -- first
>          plate --.
>
> Signed and sealed this 8th day of June 1971.

(SEAL)
Attest:

EDWARD M. FLETCHER, JR.          WILLIAM E. SCHUYLER, JR.
Attesting Officer               Commissioner of Patents